United States Patent [19]

Lorenzo et al.

[11] Patent Number: 5,163,118
[45] Date of Patent: Nov. 10, 1992

[54] LATTICE MISMATCHED HETROSTRUCTURE OPTICAL WAVEGUIDE

[75] Inventors: Joseph P. Lorenzo, Stow; Richard A. Soref, Newton, both of Mass.

[73] Assignee: The United States of America as represented by the Secretary of the Air Force, Washington, D.C.

[21] Appl. No.: 237,244

[22] Filed: Aug. 26, 1988

Related U.S. Application Data

[63] Continuation-in-part of Ser. No. 928,349, Nov. 10, 1986, abandoned.

[51] Int. Cl.⁵ .................................................. G02P 6/10
[52] U.S. Cl. ..................................... 385/132; 385/130; 385/131; 385/123
[58] Field of Search ................... 148/26, 48, 56, 65, 148/71, 72, 95, 149, 152, 154, 33, 33.1, 33.2, 33.3, 33.4; 156/610–617; 357/16, 17, 55, 56; 350/96.12, 96.14; 372/45, 46, 48; 437/26, 81, 89, 90, 126, 129, 132, 62, 83, 84, 936, 963, 973; 385/129–132, 14, 123

[56] References Cited

U.S. PATENT DOCUMENTS

| 3,984,173 | 10/1976 | Shaw | 350/96.12 |
| 4,069,094 | 1/1978 | Shaw et al. | 437/89 |
| 4,082,419 | 4/1978 | Thompson et al. | 350/96.12 |
| 4,166,669 | 9/1979 | Leonberger et al. | 385/132 |
| 4,420,873 | 12/1983 | Leonberger et al. | 437/89 |
| 4,518,219 | 5/1985 | Leonberger et al. | 385/130 |
| 4,582,390 | 4/1986 | Furuya | 350/96.12 |
| 4,670,088 | 6/1987 | Tsaur et al. | 437/89 |
| 4,693,547 | 9/1987 | Soref et al. | 350/96.14 |
| 4,695,122 | 9/1987 | Ishida et al. | 350/96.12 |
| 4,715,672 | 12/1987 | Duguay et al. | 350/96.12 |
| 4,756,734 | 7/1988 | Kersten et al. | 372/45 |
| 4,762,382 | 8/1988 | Husain et al. | 350/96.12 |
| 4,787,691 | 11/1988 | Lorenzo et al. | 357/56 |
| 4,789,642 | 12/1988 | Lorenzo et al. | 437/24 |

FOREIGN PATENT DOCUMENTS

| 0176005 | 10/1982 | Japan | 350/96.12 |
| 0159105 | 9/1984 | Japan | 350/96.12 |

*Primary Examiner*—Olik Chaudhuri
*Assistant Examiner*—Loc Q. Trinh
*Attorney, Agent, or Firm*—Robert L. Nathans; Donald J. Singer

[57] ABSTRACT

The invention comprises processes and heterostructure products defining silicon on insulator waveguides (80, 88, 90, 106, 112, 120, 122) that are suitable for use with light in the 1.3, 1.6 μm or greater wavelengths. Silicon is deposited on an insulator layer 12 on a crystalline substrate 10 and grown or regrown in crystalline form. The silicon is then etched or formed into a waveguide structures.

12 Claims, 6 Drawing Sheets

LATTICE MISMATCHED HETROSTRUCTURE OPTICAL WAVEGUIDE

This application is a continuation-in-part application of Ser. No. 928,349 filed Nov. 10, 1986, by J. P. Lorenzo and R. A. Soref, now abandoned.

BACKGROUND OF THE INVENTION

The invention relates generally to integrated optical circuits and components making up such circuits, and, more particularly to low-loss, single-mode channel waveguides that operate at the 1.3 or 1.6 µm wavelengths, or at longer wavelengths.

The recent development of low-loss single mode optical fibers with low dispersion at the 1.3 or 1.6 µm wavelengths has focused attention on long-wave integrated optical circuits and optical systems that couple to such fibers. Such optical circuits and systems are useful in telecommunication, datacommunication, optical signal processing, optical interconnection, optical sensing, and microwave antenna control applications. Semiconductor guided-wave circuits are of special interest because they could, in principle, provide optic-electronic integration; that is, the monolithic integration of optical guided-wave components with electronic circuits and with optical electrooptical components on a single "chip."

The fundamental building block of such guided-wave circuits is the channel waveguide which would be used to make directional couplers, optical switches, optical modulators, and optical interconnects between the various components. It is essential that optical-propagation losses be kept to a minimum in such channels (less than 1 dB/cm) to allow multiple guided-wave components to be cascaded on one wafer (such as a switching network) without incurring a significant loss penalty.

Another important need is to provide channel waveguides with physically small size so that the waveguides may be densely packed on a chip. In addition, the waveguide fabrication technique should be relatively simple, and should have the capability of permitting the fabrication of a wide variety of channel waveguide shapes. For example, the technique should allow stacked 3-dimensional integration of waveguide components as well as planar side-by-side (2 dimensional) integration of components.

Two prior art waveguide fabrication techniques have been used with some success, hetero-epitaxy of III-V semiconductors and homoepitaxy of silicon on silicon.

Prior art fabrication of III-V semiconductor guided-wave components for 1.3 to 1.6 µm wavelengths suffers from the complexity of using binary, ternary, and quaternary alloy compositions of various materials, and the problems which arise from hetero-epitaxy of different volatile materials upon each other. As a result, these techniques are extremely sophisticated and do not always consistently produce good quality components. Also, since conventional hetero-epitaxy techniques are somewhat complex, they are relatively expensive.

In the past epitaxial silicon-on-silicon waveguides have been formed into channels by dry etching. In such a procedure, a lightly doped waveguiding layer is grown on a heavily doped substrate. The refractive index of the substrate is typically 0.01 lower than the index of the epitaxial guiding layer. The problem with such a prior art technique is that the guided-mode light tends to leak or "tail" evanescently into the heavily doped substrate because the index step is not large enough between the epitaxial layer and substrate to offer "tight" mode confinement. Moreover, the substrate tends to yield high optical losses due to the large concentration of free carriers therein. As a result, the optical propagation loss of channels fabricated with this homojunction prior art technique is in the range of 10 to 15 dB/cm. Losses in this range are not acceptable for medium-scale integration of guided-wave components. Also, it is impractical to shrink the waveguide core channel area down to 1 µm or less because the optical losses become very large due to the extremely high doping of the Si waveguide "cladding."

It is clearly evident that there exists a need for improved optical channel waveguides which are not subject to the loss, quality and size drawbacks associated with prior art waveguides. A need also exists for improved techniques that simplify integrated optical chip manufacturing and consistently produce high quality hererostructure optical and electrooptical chips at low cost.

SUMMARY OF THE INVENTION

The present invention overcomes the problems encountered in the past and as set forth in detail hereinabove by providing several silicon-on-insulator fabrication techniques for waveguides which produce tight mode-confinement in crystalline-silicon waveguides. More specifically, the present invention involves the crystallization of a thin silicon layer over a thin dielectric layer during the fabrication process.

In several preferred embodiments of the invention fabrication of waveguides by the present invention commences with the use of a semiconductor substrate. If desired, various curved and straight rib-like patterns (depressions or ridges) can be formed in the substrate by photolithography and etching. Thereafter, a windowed dielectric (insulator) film is formed on the substrate. Amorphous or poly-silicon is then deposited on the dielectric and substrate by conventional electron beam deposition. Lateral crystalline regrowth of the amorphous silicon on the dielectric is accomplished by rapid thermal annealing, or conventional annealing, resulting in a conversion to crystalline silicon. Liquid phase epitaxy (LPE), techniques can also be used to overgrow the silicon on the insulator.

In the preferred embodiment of the invention, the above method is used to form heterostructures. In these heterostructures the method of this invention limits crystal defects to areas directly over crystal seeding windows in the dielectric.

In some preferred embodiments of the invention the silicon on insulator (dielectric) layer is etched to form the waveguides. Further, a passivating layer is generally deposited on the top layer to protect the waveguide from environmental changes that might affect its operation. All of the fabrication techniques of the present invention are fully compatible with a variety of electro-optical control structures that deplete or inject charge carriers in the waveguide core, or apply high electric fields to the waveguides.

It is therefore an object of this invention to provide a variety of fabrication techniques for making heterostructure devices having curved or straight channel waveguides of crystalline silicon on a dielectric layer.

It is a further object of this invention to provide channel waveguides which are highly transparent at 1.3 and 1.6 μm, with the optical propagation losses being much less than 1 dB/cm.

It is yet another object of this invention to provide simple, cost-effective waveguide manufacturing techniques that offer a variety of integrated waveguide structures including vertically integrated (multi-layered) 3-d and planar 2-d structures.

It is still another object of this invention to provide a method of manufacturing heterostructures with silicon waveguides that offer monolithic integration of electronic and guided-wave components including optical sources and detectors.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

The fabrication techniques of the present invention generally involve the manufacture of dielectrically isolated crystalline-silicon (c-Si) "fibers" or "channels" (solid waveguide pipes with a roughly rectangular cross-section) as well as a number of rib waveguide shapes on a dissimilar substrate.

Reference is now made to FIGS. 1-4 for a detailed analysis of the various techniques of the present invention. More specifically, FIGS. 1A-1G pictorially depict a preferred manufacturing procedure. This technique begins with a flat, polished and oriented indium phosphide or other III-V semiconductor substrate 10, as shown in FIG. 1A. The preferred stubstrate materials specfically include substrates that yield long wave optical sources such as InGaAs, Ge, CdTe, InGaAsP, GaAlAs and AgCdTe. As shown in FIG. 1B, a dielectric layer 12 of a material such as silicon oxide ($SiO_2$) is grown on the substrate 10 to a thickness of about 0.5 to 1.0 μm. The III-V substrate 10 can be coated with $SiO_2$ or other glassy material by remote plasma, native oxide formation, E-beam deposition, or by a-Si deposition followed by conversion into the oxide by ion-implantation, anaodic oxidation, or thermal oxidation. Alternatively, a 0.5 μm film of silicon nitride ($Si_3N_4$) can be deposited by chemical vapor deposition.

Figure 1A:
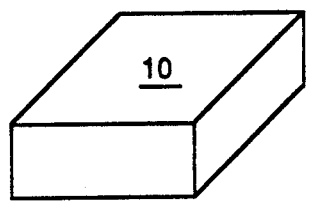
FIGS. 1A-1G are pictorial representations of a preferred channel waveguide fabrication process incorporating the principles of this invention.
Figure 1B:
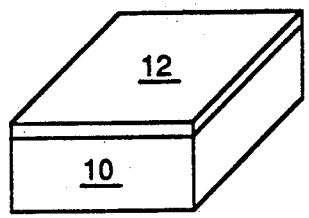
Figure 1C:
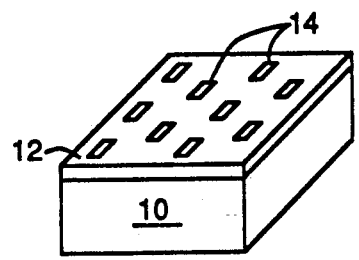
Figure 1D:
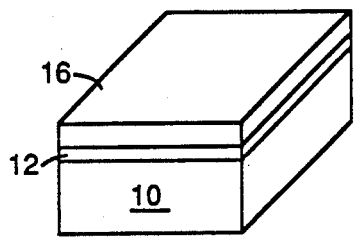
Figure 1E:
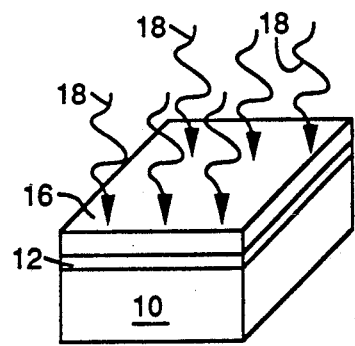
Figure 1F:
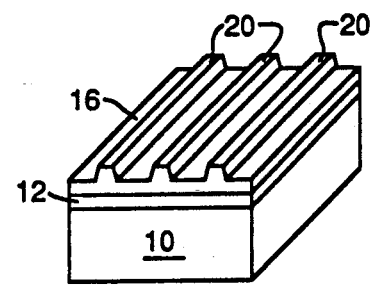

Small holes or windows 14 (FIG. 1C) are then etched through the dielectric layer 12 to the substrate by conventional photolithography. The exact geometry of the etched holes 14 is determined by the shape(s) of the guided-wave components desired. In the view of FIG. 1C, holes 14 in dielectric layer 12 are arranged in discontinuous parallel stripes. Next, as illustrated in FIG. 1D, a layer of amorphous silicon (a-Si) 16 is deposited over the dielectric 12 by a conventional electron beam (E-beam) or other low temperature process in a high-vacuum environment. The a-Si layer, which is approximately 0.5 to 2 μm thick, covers the entire dielectric layer 12 and fills the etched holes 14, making intimate contact with the c-Si substrate 10.

The next step of the fabrication process (FIG. 1E) involves thermal heating (indicated by arrows 18) provided by a laser, incandescent lamp, resistance heater, or an E-beam source. This thermal heating anneals the non-crystalline a-Si and promotes epitaxial regrowth (recrystallization) in the solid phase. If regrowth is done properly, it is possible to obtain uniform mono-crystal silicon, rather than polycrystal silicon with numerous grain boundaries.

The crystallographic orientation of the Si layer 16 is determined by the substrate 10. Since the a-Si 16 is in intimate contact with the InP crystalline substrate 10 through the etched holes 14, the substrate 10 provides the seeding for proper crystal growth and orientation. Any defects generated by the lattice mismatch at the heterointerface will be terminated in the vicinity of each etched hole 14. This occurs because the defects propagate parallel to the seeded growth recrystallization direction (vertically). The crystalline material over the dielectric is regrown in a direction orthogonal to that of the seeded growth front i.e., the crystallographic growth plane (front) is perpendicular to the seeding plane. This results in a defacto barrier to line defects propagating from the heterojunction interface.

An alternative to this step is lateral epitaxial regrowth that is seeded from the same holes in the oxide. The process of preparing the oxide and the hole etching are similar to the previously described process, however in this case, c-Si is formed during the deposition process, preferably by liquid phase heteroepitaxy. This alternative epitaxy begins selectively in the holes and relies again on vertical seeding up from the substrate to form a defect free growth front which spreads laterally across the oxide.

It should be noted that so-called vapor phase techniques such as MOCVD, MBE, UPE, CVD and variants will not produce similar results. Polycrystalline deposits on the dielectric result in polynucleation sites that preclude a pure crystalline heteroepitaxial film from forming.

In FIG. IF, the amorphous silicon layer 16 which has been converted to crystalline silicon is ready for the formation of waveguides 20 therein. The waveguides (ribs) 20 are formed by either a dry etching process (reactive ion etching, ion beam milling, plasma etch) or a wet chemical etch, together with photolithographic masking of micron-sized features, to form the desired rib structures (either exposed ribs or exposed tube waveguides). Implant doping steps $p^+$ or $n^+$, for active devices can be carried out prior to waveguide etching, if desired. Typically, the crystalline silicon is undoped to obtain very low material losses, although in some cases the waveguide is locally doped (over a few hundred microns) at the $10^{17}$ cm$^{-3}$ level so that the doped region may be depleted with control bias for optic phase modulation or switching as discussed in our related patent entitled "Electro-optical Silicon Devices" U.S. Pat. No. 4,787,691.

Figure 1G:
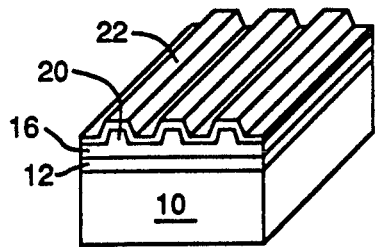

The ribs 20 are finally covered with a SiO$_2$ passivating layer 22 as shown in FIG. 1G. The passivating layer is added to protect the waveguides from environmental changes due to handling or operating location. By separating the waveguide from the environment, consistent operation is assured and the waveguides are made more rugged.

This process allows Si and InP devices (both guided-wave and electronic) to be fabricated on the same substrate. Thus non-lattice matched elemental semiconductors and their alloys can be joined to provide continuous crystalline films for electrooptic integrated functions. In particular, InGaAsP optical sources such as heterojunction lasers and detectors can be integrated monolithically with Si waveguide devices and electronic circuits.

Figure 2A:
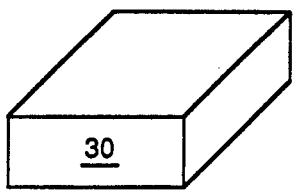
FIGS. 2A-2I are pictorial representations of a second preferred channel waveguide fabrication process of this invention.
Figure 2B:
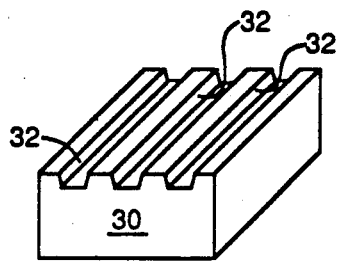
Figure 2C:
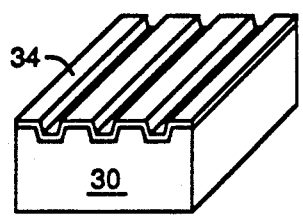
Figure 2D:
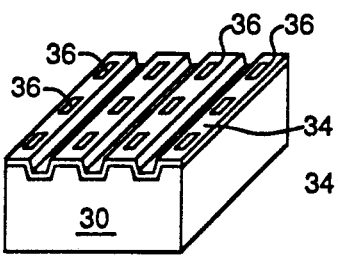

FIGS. 2A-I pictorially represent a process of this invention for producing complex waveguide structures. As illustrated therein the procedure begins with a III-V or crystalline silicon (C-Si) substrate 30, the same as in FIG. 1A. In the next step (FIG. 2B), the substrate 30 is etched via photolithography into a set of depressed (inverted) ridges 32 as desired for part of the final waveguide structure. Thereafter, as shown in FIG. 2C, deposition or growth of a 0.5 to 1 m dielectric film 34 over ridges 32 is effected. Small windows 36 are then etched in dielectric layer 34 for seeding (FIG. 2D). Preferably the windows are displaced from the immediate vicinity of the channel waveguides so that they will not cause losses in light transmission. Holes or windows 36 also provide electrical contact to substrate 30, if desired.

Figure 2E:
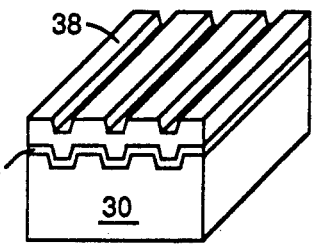
Figure 2F:
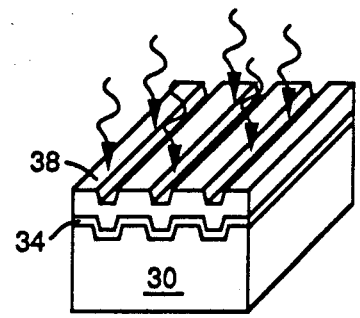
Figure 2G:
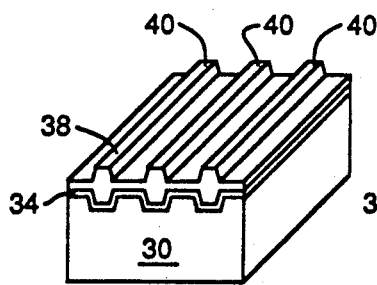

FIGS. 2E and 2F illustrate deposition of an a-Si layer and growth of c-Si as before. The resulting top silicon layer 38 can be made slightly thicker than before, e.g., several microns, so that the corrugated Si film can be etched, if desired. The a-Si layer 38 is recrystallized into c-Si by thermal heating. Seeding again occurs from the III-V substrate. Dislocations resulting from the Si/substrate lattice mismatch will propagate in the vicinity of the etched holes and for the most part be perpendicular to the substrate surface (which confines them to the holes). Lateral regrowth, parallel to the substrate surface, along the perpendicular crystallographic direction provides dislocation-free crystalline silicon away from the etched holes. Thereafter, as shown in FIG. 2G, the c-Si film can be photolithographically etched into additional upright rib shapes 40. The shapes can include dual-convex (FIG. 6A) and dual-concave ribs (FIG. 6B). As an alternative, the exposed corrugations of film 38 can be etched flat (FIG. 2H) so as to yield inverted ribs 39. Thereafter, a final passivation layer 42 is applied to the c-Si film 38 (FIG. 2I).

Reference is now made to FIGS. 3A-3E which depict three dimensional (3-D) integration (vertical integration) of guided-wave components. This procedure is similar to the procedure described above, with the product depicted in FIG. 2H being also represented in FIG. 3A. Consequently, like numerals will be used for equivalent structures in both FIGS. 2A-2I and FIGS. 3A-3C.

Figure 2H:
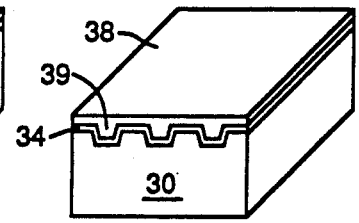
Figure 2I:
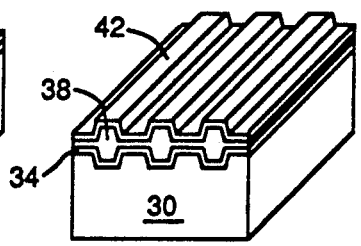
Figures 3A, 3B, 3C:
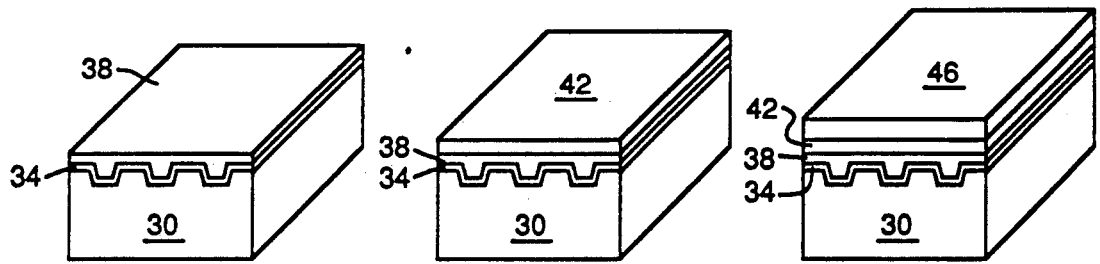
FIGS. 3A-3E are pictorial representations of a fabrication process for a vertically integrated waveguide of this invention.
Figures 3D, 3E:
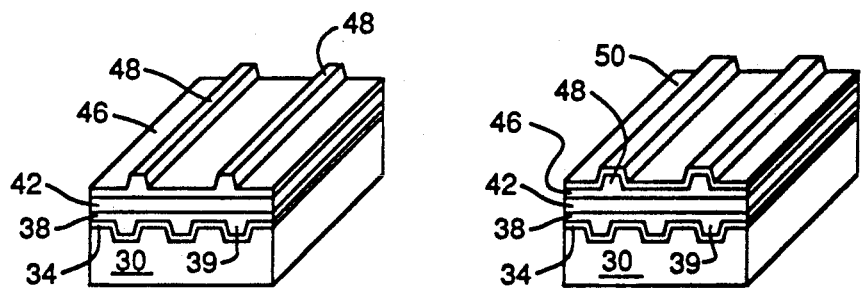

FIG. 3B illustrates the growing of a dielectric layer 42 over c-Si film 38 of the waveguide of FIG. 2H. In the next step, as shown in FIG. 3C, a second layer 46 of a-Si is added and then recrystallized as c-Si. The upper layer 46 of c-Si is then etched into a waveguide pattern 48 different than the waveguide pattern in the substrate layer 30 (FIG. 3D). The top set of guides 48 is then passivated with an oxide layer 50 as shown in FIG. 3E. The final structure of FIG. 3E therefore comprises a three dimensional integration of waveguides 39 and 48. The first waveguide layer 38 is isolated from a second different waveguide layer 48. This multilayer pattern opens up the possibility of complex interconnection of optical signals as may be required for complex circuitry, including interlayer communication.

Figure 4A:
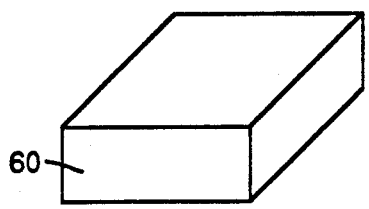
FIGS. 4A-4E are pictorial representations of a fourth waveguide manufacturing process that embodies the principles of this invention.
Figure 4B:
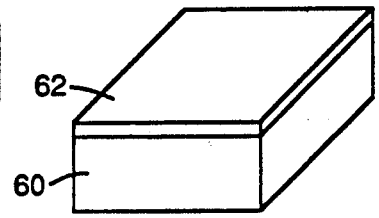
Figure 4C:
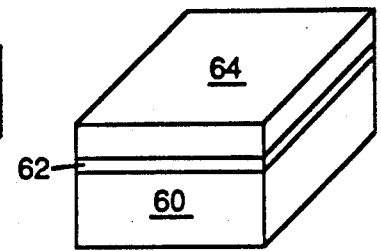
Figure 4D:
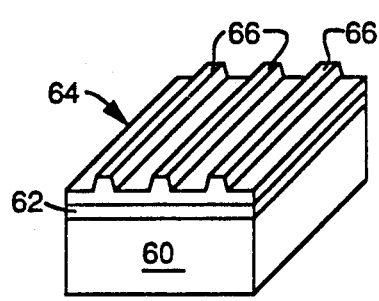
Figure 4E:
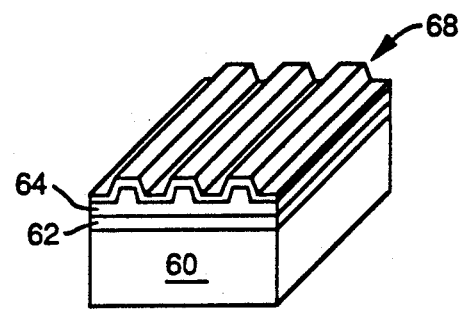

Reference is now made to FIGS. 4A-4E which pictorially represent an alternate technique of this invention, more specifically a lattice matched epitaxial insulator approach. Initially a flat c-Si substrate is provided (FIG. 4A) and a film 62 of c-CaF$_2$ (for example) is grown via molecular beam epitaxy (MBE) on the flat c-Si substrate 60 in a manner described in more detail in an article by Smith, T. P. III et al, "Fabrication of Metal-Epitaxial Insulator-Semiconductor Field-Effect transistors using molecular beam epitaxy of CaF$_2$ on Si," *App. Phys. Lett.*, 48(8), Oct. 15, 1984, pp. 907–909 which is incorporated herein by reference. Next (FIG. 4C), a 1 μm film 64 of single crystal silicon is grown epitaxially directly on the crystalline insulator 62 by means of MBE, recrystallization not being employed. Since the insulator is substantially lattice matched to c-Si only minor dislocations occur proximate to the insulator-silicon boundary. Acceptable single crystal silicon is grown away from the immediate interface, thus through-hole etching is not required. FIG. 4D shows photomasking and etching, which results in forming the c-Si layer 64 into a set of rib waveguides 66. Then an SiO$_2$ passivating layer 68 is deposited or grown by dry and wet oxidation techniques as depicted in FIG. 4E.

The waveguides resulting from the process of FIGS. 1-4 give multimode or single mode optical propagation at 1.3–1.6 μm (and beyond), although in most cases, the waveguides would be designed for single-mode propagation. The resulting single-mode guides are unique and novel in integrated optics because they offer heterostructure and homostructure waveguides whose lateral dimensions are in the micron or sub-micron range. To better understand the waveguide sizing achieved with the fabrication techniques of the present invention the following analysis is presented.

To determine the smallest permissible physical size of the c-Si "fibers", it is possible to make appropriate calculations using traditional readily available waveguide formulas such as the inequality for the single-mode cutoff diameter (D) of a step-index cylindrical fiber.

$$(\pi D/2)\cdot(n^2_{core}-n^2_{clad})^{\frac{1}{2}} < 2.405$$

where $n_{core}$ is the core index and $n_{clad}$ is the cladding index of refraction.

In the present invention, the refractive index of SiO$_2$ dielectric "cladding" is approximately 1.47 at 1.3–1.6 μm, while the index of Si$_3$N$_4$ is approximately 1.96 at those wavelengths, and the index of CaF$_2$ is 1.42 over that range. For c-Si, the index is 3.50 at 1.3 μm and is 3.46 at 1.55 μm. As a result, the refractive-index step between core and cladding is quite large, about 2.0. By substituting the c-Si and SiO$_2$ n-values into the above formula, it is apparent that higher-order modes will not propagate for wavelengths greater than 1.3 μm if the core diameter for the oxide-clad cylindrical c-Si core is 0.31 μm or less, a very small diameter. For oxide-clad rib waveguides, the single-mode-only cross-sectional dimensions are larger than 0.3 μm, so the dimensions can be sub-micron. Mode-confinement to 1 μm or less in the vertical direction is provided by the 2.0 refractive index step between crystalline silicon Si and insulator.

Lateral mode-confinement to 1 μm or less is provided by a physical step between the rib height and rib platform. For example, an 0.8 μm ridge may be designed on an 0.2 μm platform. Thus, sub-micron channels are clearly feasible in c-Si.

In view of the above, a wide repertoire of waveguide shapes and structures is available as illustrated in the drawings of FIGS. 5–6 which show perspective views of single channel waveguides (the integration of many channels is not shown for simplicity and the through holes in FIG. 1 are assumed to be located away from the waveguide rib).

FIG. 5 discloses an exposed rib waveguide device 80 having a substrate 81 and light propagation area 82 which is nested between insulating layer 84 and passivating layer 86. The light propagation area, or silicon fiber, 82 is isolated by the insulating layer 84, the passivating layer 86 and the top silicon layer 87 which has insufficient thickness to support light propagation in areas adjacent to the fiber.

Figure 5A:
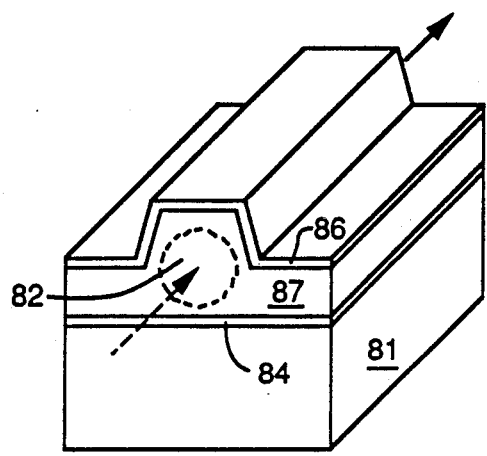
FIGS. 5A-5D are perspective views of four types of optical waveguides that can be fabricated by the manufacturing processes described in reference to the above cited figures and which incorporate the principles of this invention.
Figure 5B:
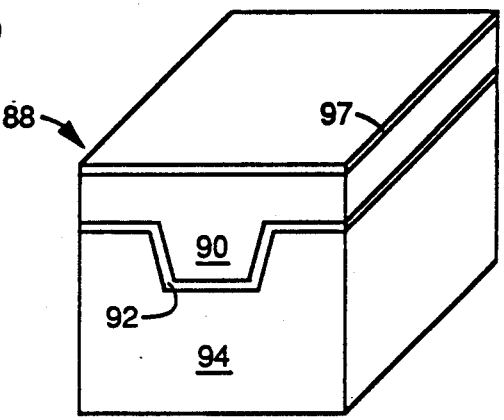

A second buried rib waveguide 88 is shown in FIG. 5B. Waveguide 88 has a light propagating fiber 90 that is essentially an upside down version of the rib fiber 82 of FIG. 5A. The dielectric layer 92 here covers a previously etched substrate 94. The silicon top layer 96 is only thick enough at the etched ribs 90 to support light transmission. A passivating layer 97 is also provided.

Figure 5C:
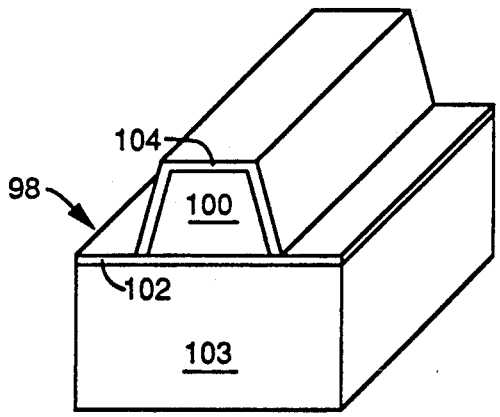

FIG. 5C shows an exposed tube, or strip, waveguide 98. Unlike the rib waveguide discussed above, the waveguide 100 is completely contained by the dielectric layer 102 and the passivating layer 104. The substrate 103 of this device 98 need not be etched.

Figure 5D:
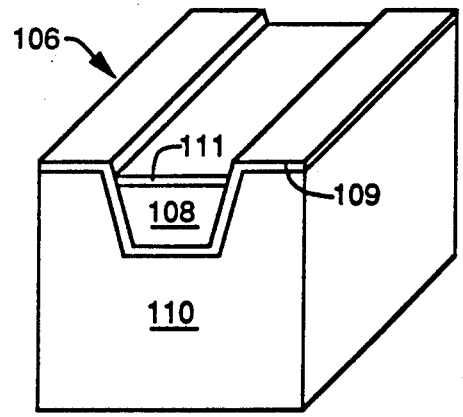

FIG. 5D shows a buried tube device 106 similar to the device of FIG. 5C except that the waveguide 108 is formed in a depression created by epitaxial etching of the substrate 110. A dielectric layer 109 covers the etched substrate 110 and a passivating layer 111 covers the waveguide tube 108.

Figure 6A:
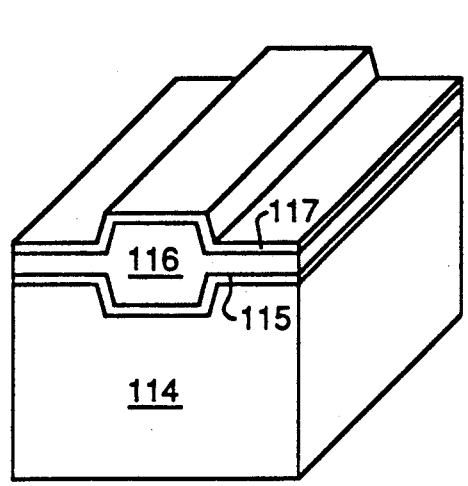
FIGS. 6A-6C are perspective views of three additional types of optical waveguides that can be fabricated by the processes of this invention.
Figure 6B:
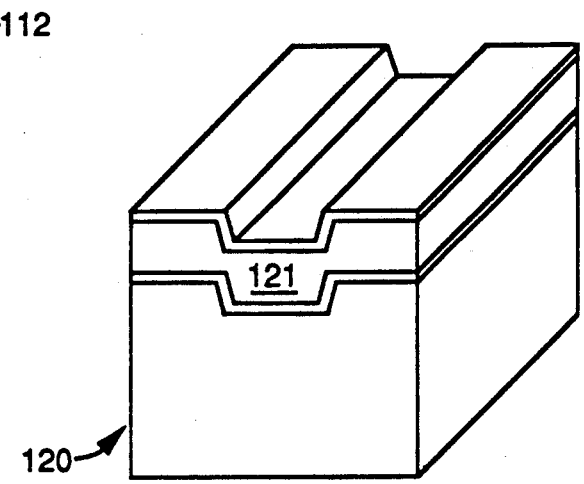
Figure 6C:
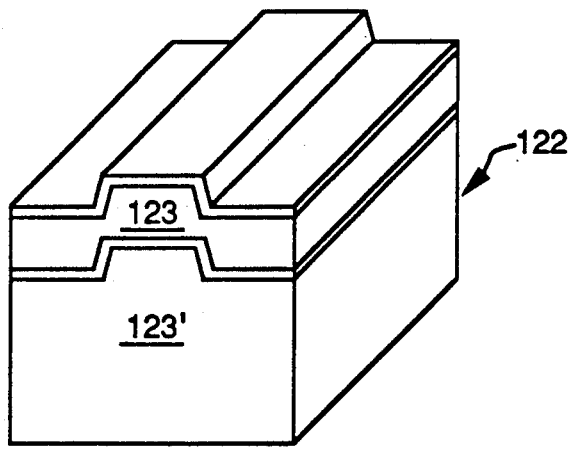

FIG. 6A, 6B and 6C show three variations in ribbed waveguide design. FIG. 6A shows an exposed convex dual rib device 112 which is developed by etching of both the substrate 114 and the silicon waveguide material 116. The top layer waveguide material 116 is only of sufficient height to support single mode lightwave propagation in rib area 118. Dielectric film 115 and passivating layer 117 bracket the waveguide top silicon layer 116.

FIG. 6B shows a buried concave dual rib (121) waveguide device 120 which is particularly useful in applications where exposed ribs are unacceptable. Finally, FIG. 6C shows an exposed concave dual rib (123) device, 122 which is particularly suited to multilayer applications where deep etching of the substrate 124 (which may be a lower level waveguide) should be avoided. In all other respects devices 120 and 122 are identical to device 112.

The devices disclosed in FIGS. 5 and 6 show the tremendous flexibility of silicon on insulator waveguide approach. Optical signals can be transmitted virtually anywhere on a wafer using the hole process and linked to non-parallel waveguides. This flexibility makes such devices most useful for many electro-optical applications and makes it feasible to construct large integrated optical circuits on a single III-V chip.

While the invention has been described with reference to the particular embodiments thereof, it will be understood by those skilled in the art that various changes in substance and form can be made therein without departing from the spirit and scope of the invention as detailed in the attached claims.

We claim:
1. A hetrostructure optical waveguide comprising:
   (a) a first crystalline layer of a first semiconductor material;
   (b) a dielectric film covering said first crystalline layer and having a plurality of seeding windows formed completely therethrough;
   (c) a second crystalline layer of a second semiconductor material lattice mismatched with respect to the material of said first crystalline layer, said second crystalline layer having a light transmission configuration and a major surface covering said dielectric film and joined with said first crystalline layer via regions passing through said seeding windows, said regions containing lattice mismatch defects oriented orthogonally with respect to the major surface of said second layer causing said defects to terminate in areas over said seeding windows.

2. The waveguide of claim 1 wherein said first semiconductor material is a group III-V material.

3. The waveguide of claim 1 wherein said second semiconductor material is selected from the group consisting of Si and Ge.

4. The waveguide of claim 2 wherein said second semiconductor material is selected from the group consisting of Si and Ge.

5. The waveguide of claim 1 wherein said dielectric film comprises silicon dioxide.

6. The waveguide of claim 2 wherein said dielectric film comprises silicon dioxide.

7. The waveguide of claim 3 wherein said dielectric film comprises silicon dioxide.

8. The waveguide of claim 4 wherein said dielectric film comprises silicon dioxide.

9. The waveguide of claim 1 wherein said seeding windows are configured as discontinuous stripes.

10. The waveguide of claim 3 wherein said seeding windows are configured as discontinuous stripes.

11. The waveguide of claim 4 wherein said seeding windows are configured as discontinuous stripes.

12. The waveguide of claim 8 wherein said seeding windows are configured as discontinuous stripes.

* * * * *